US000001936H

(19) United States

(12) Statutory Invention Registration (10) Reg. No.: US H1936 H

Lin et al. (43) Published: Jan. 2, 2001

(54) METHOD OF COATING NYLON AND POLYESTER FIBERS WITH WATER DISPERSIBLE POLYVINYL ACETATE AND COATING ACHIEVED THEREFROM

(75) Inventors: Tingdong Lin, Wilmington, DE (US); Jing-Peir Yu; P. Robert Peoples, both of Pensacola, FL (US)

(73) Assignee: Solutia, Inc., St. Louis, MO (US)

(21) Appl. No.: 09/216,621

(22) Filed: Dec. 17, 1998

(51) Int. Cl.[7] ..... C08L 29/04; C08L 31/02

(52) U.S. Cl. ..... 524/557; 524/563

*Primary Examiner*—Michael J. Carone

*Assistant Examiner*—Aileen J. Baker

(74) *Attorney, Agent, or Firm*—Arnold White & Durkee

(57) ABSTRACT

An aqueous, coatable, thermally condensable composition is disclosed. The coating is based on dispersions of vinyl acetate polymers in water. Uniquely, the coating can be advantageously used for both nylon and polyester yarns. The coated yarns exhibit performance equivalent to or better than coated yarns based on traditional compositions.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF COATING NYLON AND POLYESTER FIBERS WITH WATER DISPERSIBLE POLYVINYL ACETATE AND COATING ACHIEVED THEREFROM

FIELD OF THE INVENTION

This invention relates to an aqueous coating process for use with synthetic fibers. In particular, this invention relates to a coating process that can be effectively employed with both solution dyed nylon yarn and non-solution dyed nylon yarn as well as with polyester yarns. Specifically, this invention relates to a water dispersible coating based upon polyvinyl acetate.

BACKGROUND OF THE INVENTION

Nylon and polyester yarns, regardless of the number of plies, are generally not suitable for use in industrial sewing applications unless they are bonded with a polymeric coating that encircles, or encapsulates, the yarn. The coating protects the twisted yarn from breaking and unraveling into the individual cords. An uncoated yarn used in industrial sewing applications will experience fraying and a significant number of breaks due to the high line speeds, significant tension, and significant friction.

Coating compositions, or bonding agents, that are employed with nylon and polyester fibers are well known in the art. Coatings based on low molecular weight nylons in organic solvents are common. Typical solvents employed in the various coating processes of the prior art include methanol and methylene chloride. Such systems pose fire, health, and environmental hazards and are expensive. These organic solvents are also prone to cause leaching of dye from the yarns. Additionally, the use of such systems may in the future become limited due to governmental regulations.

Between methanol and methylene chloride, the concomitant hazards associated with the use of methylene chloride are appreciably more severe than those associated with the use of methanol. As such, between the two, the use of methanol in coating systems is preferred. This preference is apparent in numerous prior art processes in which nylon yarns are coated. Unfortunately, the use of methanol systems to coat polyester yarns with common coatings, such as the aforementioned low molecular weigh nylons, has not proved to be as efficacious. In polyester coating operations, the use of methylene chloride is therefore more common. As such a coating process that could effectively be employed for both nylon and polyester yarns would be desirable. Even more desirable would be such a coating process that could be employed in an aqueous environment without the need for organic solvents. An aqueous based system would be less expensive, less prone to dye leaching concerns, and less likely to be subject to future governmental regulations.

Another problem with prior art processes used for the coating of nylon and polyester fibers relates to the practice of finishing. Nylon yarns can generally be divided into two categories: solution dyed yarn and non-solution dyed yard. For solution dyed yarns, a selected pigment or other colorant is added to the base polymer prior to extrusion. For non-solution dyed yarn, a selected dye is provided via a dye bath after extrusion of the base polymer into fiber. The dye penetrates the fibers to provide the finished color.

For both solution and non-solution dyed nylon yarns and for polyester yarns, the extruded and spun yarn, individually or in combination with a second, third, fourth yarn, etc., is twisted into a helical structure, often having been drawn in the process, and collected onto a bobbin. During these steps, a finish consisting of oil and other ingredients is applied to the yarn. The finish reduces static and aids in the processing of the thread by decreasing the potential for breaking of the yarn in the drawing and twisting process.

A problem with the finish is that if not removed from the yarn prior to the coating operation, the residual finish can prevent or substantially interfere with the bonding between the coating and the base fiber. In non-solution dyed yarn, this problem is ameliorated due to other necessary, if not desirable, process steps. After finishing, the uncolored non-solution dyed yarn is passed through the equivalent of a dye bath, without the dye, in which the yarn is subjected to a wash, or scouring, consisting of boiling water and a detergent. The washed non-solution dyed yarn is then dyed by passing the yarn through a conventional dye bath. The finish is removed to allow the dye to effectively penetrate the nylon yarn. Emerging from the wash and dye steps, the now colored yarn has no, or very little, residual oil left on its surface.

Solution dyed yarn emerging from the extrusion and twisting steps is already colored as desired and as such the use of a separate dying step and the obligatory scouring bath is unnecessary. As one might imagine however, bypassing the scouring bath also results in a solution dyed yarn having residual oil from the finishing procedure on its surface. The traditional low molecular weight nylon coatings can not effectively displace the residual oil from the surface of the solution dyed yarn. The resulting coating obtained without first removing the residual oil is imperfect and provides insufficient appearance retention. This has necessitated that the solution dyed yarn also be subjected to a washing or scouring process to remove the residual oil. This additional process step is thus inefficient and costly. The need to conduct a scouring operation is also apparent in most prior art coating processes used for polyester yarns.

Accordingly, a coating process that could be used effectively for both non-solution dyed yarn and solution dyed yarn as well as polyester yarn, without the necessity of an additional washing and scouring step, would be extremely desirable. Thus, there is a need for a coating process that could be used effectively for both nylon and polyester yarns, utilize an aqueous dispersion system rather than a system in which a solvent such as methanol or methylene chloride is necessary, and result in an effective coating for the various yarns without the necessity of a scouring process to remove residual finishing oil.

SUMMARY OF THE INVENTION

The present invention meets these and other needs by providing an aqueous coating system in which polyvinyl acetate homopolymers and copolymers are used as the bonding agent. More than one polyvinylacetate may be utilized to achieve the coating. The polyvinyl acetate system is effective for the coating of both types of nylon yarns as well as for polyester yarns.

The need to employ a separate scouring operation for the various yarns is minimized with the polyvinyl acetate and water system. The need for the separate scouring operation is further reduced by the inclusion of a coupling agent in the polyvinyl acetate/ water coating emulsion.

DESCRIPTION OF THE PREFERRED EMBODIMENTS

Nylon and polyester yarns can be made by a variety of methods well known in the art. The present disclosure relates to methods of treatment of the yarns after they are initially produced. It is anticipated that the methods presently disclosed can be utilized with any of the aforementioned methods for producing the initial nylon and polyester yarns.

In one embodiment of the invention, the aqueous coating system utilizing polyvinyl acetate as the bonding agent is used to bond non-solution dyed yarn. In accordance with this embodiment, the non-solution dyed yarn emerges from an extruder or equivalent device. The yarn is spun and a traditional finish oil is applied. The yarn is then subjected to a traditional dye bath operation. Such a dye bath will often contain a target dye and a detergent dissolved or dispersed in boiling water.

The dyed yarn is then subjected to the bonding operation. The yarn is passed through a bath containing a stable dispersion of polyvinyl acetate in water. The polyvinyl acetate bonding agent will typically be present in the form of a copolymer although homopolymers may also be used. Copolymers containing ethylene are particularly common. The characteristics of the coating bath, water temperature, concentration of polyvinyl acetate in the bath, percentage vinyl acetate in the polyvinyl acetate polymer, and time in the bath, will vary with other process parameters, including but not limited to the desired coating thickness and process line speeds. Such determinations are within the capabilities of one of ordinary skill in the art having the benefit of this disclosure.

After the coating operation, the coated fiber is passed through a drying operation. Any of the drying procedures commonly used in the art can be employed with the disclosed process as long as temperatures are maintained below those that would bring about melting of either the coating or the underlying thread. Temperatures ranging from about 200–600° F. are acceptable, with temperatures ranging from about 400–500° F. being preferred. The use of an infrared heater to effectuate drying is particularly preferred.

The yarn thus obtained exhibits a more consistent coating and is less sensitive to fraying and breaking during use that a comparable yarn obtained with a coating operation employing a low molecular weight nylon in methanol.

Depending upon the utilized dye and desired end color, one making use of this disclosure may still find it necessary to subject the non-solution dyed nylon yarn to a scouring operation prior to dying to substantially remove the finish oil. However, even in cases where it is necessary to substantially remove the finishing oil prior to dying, the presently disclosed coating operation is more tolerant of residual oil levels than prior art coating processes.

In certain instances in which the coating obtained via the disclosed process is not sufficiently resistant to subsequent processing, a coupling agent can be utilized to improve bonding. The coupling agent facilitates bonding by penetrating the oil layer and provided a link between the bonding agent and the yarn. Depending on the coupling agent, the linkage with either the bonding agent or the yarn may be due to either entanglement or reactive coupling. The coupling agent when used in this manner is added to the coating bath. As one might expect, the use of a coupling agent as indicated has a lesser effect when the oil has been substantially removed to facilitate maximum uptake of dye. The use of a coupling agent in this manner is more readily adaptable to the presently disclosed process than prior art processes as the presence of methanol, methylene chloride, or other organic solvents can often have deleterious effects on the performance of the coupling agent.

Any of the traditional coupling agents can be employed, including those based on silane, siloxane, titanate, and zirconate. Coupling agents based upon silane are particularly preferred.

In accordance with another embodiment of the invention, the aqueous coating system utilizing polyvinyl acetate is used to bond solution dyed yarn. In solution dyed yarn operations, unlike non-solution dyed yarn operations, there is no independent need to conduct a separate scouring operation in order to achieve the desired end color. As previously indicated, dying of solution dyed yarn is achieved by adding dye to the polymer prior to the spinneret or equivalent device.

Again, in certain instances in which the coating obtained via the disclosed process is not sufficiently resistant to subsequent processing, a coupling agent can be utilized to improve bonding. As was the case with non-solution dyed nylon yarn, the coupling agent effectuates bonding by penetrating the oil layer.

In accordance with another embodiment of the invention, the aqueous coating system utilizing polyvinyl acetate is used to bond polyester yarn. As previously indicated, a problem with prior art coating systems is that the same coating systems can not be effectively employed for both nylon and polyester yarns. While low molecular weight nylons have been used as coatings for both nylon yarns and polyester yarns, methanol has traditionally been used as the solvent for nylon yarns while methylene chloride has traditionally been used as the solvent for polyester yarns. The inability to use the same solvent/coating system for both nylon and polyester yarns is due to the difference in surface energy between the nylon and polyester yarns.

An advantage of the present coating system is that the polyvinyl acetate in water system can be used for both nylon and polyester yarns. When the present coating system is utilized to bond polyester yarn, it is employed or applied in the same manner as previously described for nylon yarns.

An additional advantage of the present coating process, whether employed with nylon or polyester yarns, is that the aqueous systems, in contrast to systems employing organic solvents like methanol or methylene chloride, are not as prone to dye leach concerns.

In certain instances and for certain applications it may be desirable to add other additives. Such additives include other film forming polymer emulsions, adhesion promoters, plasticizers, wetting agents, antifoaming agents, and UV stabilizers, including both UV blockers and UV absorbers.

In the various embodiments of the present coating process, the vinyl acetate polymers will comprise between 10 and 100% of the total weight of the emulsion. Preferably, the polyvinyl acetate polymers will comprise between 50 and 80% by weight of the emulsion. When employed, additional additives preferably will be present in the following amounts: coupling agents (about 0.1 to about 2.0%), UV stabilizers (about 1.0 to about 50%), antifoaming agents (about 0.1 to about 1.0%), wetting agents (about 0.1 to about 5.0%), plasticizers (about 1.0 to about 20%), and adhesion promoters (about 3 to about 40%).

EXAMPLES

The following examples are provided to illustrate the present invention. However, it should be understood that the examples provided do not represent the entire scope of the present process.

Three coating emulsions, exemplary of the present process, were prepared as follows. Percentages represent the amount by weight of the total additives.

| Additives* | Function | A | B | C |
|---|---|---|---|---|
| Flexthane ® 620 | acrylic/urethane emulsion | 24.0 | — | — |
| Flexbond ® 325 | vinyl acetate emulsion | — | 23.88 | 29.85 |
| Vinac ® 521BP | vinyl acetate emulsion | 40.0 | — | — |
| Airflex ® 426 | vinyl acetate emulsion | 16.0 | 11.94 | 5.97 |
| etherified monool | wetting agent | 0.5 | 0.5 | 0.5 |
| Foamaster ® VF | antifoaming agent | 0.02 | — | — |
| Z-6020 ® | coupling agent | 0.2 | — | — |
| Z-6040 ® | coupling agent | 0.2 | — | — |
| aqueous latex containing a UV absorbing polymer | UV stabilizer | — | 23.88 | 23.88 |
| water | | 19.08 | 39.80 | 39.80 |

*Flexthane ® 620 is a acrylic/urethane polymer emulsion that additionally contains 1-methyl-2-pyrrolidone and is available from Air Products. Flexbond ® 325 is a vinyl acetate-butyl acrylate copolymer emulsion and is available from Air Products. Vinac ® 521BP, also available from Air Products, is a vinyl acetate polymeric emulsion. Airflex ® 426 is a vinyl acetate polymeric emulsion available from Air Products that also contains a small amount of formaldehyde. The etherified monool employed was a decyl alcohol with six moles of ethylene oxide. Foamaster ® VF, a product of the Henkel Corporation, is a proprietary blend containing petroleum derivatives (oil mist). Z-6020 ® is a silane coupling agent available from Dow Corning containing ethylene diaminepropyl trimethoxysilane as a primary ingredient. Z-6040 ® is a silane coupling agent available from Dow Corning containing glycidoxypropyl trimethoxysilane as a primary ingredient. Acceptable aqueous latexes containing UV absorbing polymer include those taught in U.S. Pat. No. 5,629,365 containing vinyl functionalized monomers of benzotriazole or benzophenone.

Both nylon and polyester yarns were prepared using the indicated coating compositions. Yarns of varying denier, ranging from 70 to 630, were coated. These yarns were compared to similar yarns coated by traditional prior art processes, methanol and low molecular weight nylon for nylons and methylene chloride and low molecular weight nylon for polyester.

All yarns prepared with the vinyl acetate coating exhibited bonds that were equivalent to or better than bonds on yarns prepared with the prior art coatings. Additionally, the bonds prepared with vinyl acetate were softer. Softer threads are desirable because they generate less heat during high speed sewing.

What is claimed is:

1. A coatable, thermally condensable composition comprising an aqueous dispersion of a vinyl acetate polymer.

2. The composition of claim 1 additionally comprising at least one additive selected from the group consisting of a polymer binder, an adhesion promoter, coupling agents, and UV stabilizers.

3. A process for producing a break resistant, coated solution dyed nylon, non-solution dyed nylon, or polyester yarn comprising passing a previously dyed solution dyed nylon, non-solution dyed nylon, or polyester yarn through a bath containing a water and polyvinyl acetate dispersion; passing the yarn now coated with a layer of the water and polyvinyl acetate dispersion through a drying stage; and recovering a bonded yarn possessing a solid coating of polyvinyl acetate.

4. The process of claim 3, wherein the bath additionally contains at least one additive selected from the group consisting of coupling agents, UV stabilizers, polymer binders, adhesion promoters, plasticizers, wetting agents, and antifoaming agents.

* * * * *